United States Patent
Baig et al.

[11] Patent Number: 5,395,438
[45] Date of Patent: Mar. 7, 1995

[54] MINERAL WOOL-FREE ACOUSTICAL TILE COMPOSITION

[75] Inventors: Mirza A. Baig, Des Plaines; Mark H. Englert, Buffalo Grove; John C. Gaynor, Antioch; Michael A. Kacner, Lindenhurst; Rajinder Singh, Mundelein, all of Ill.

[73] Assignee: USG Interiors, Inc., Chicago, Ill.

[21] Appl. No.: 182,263

[22] Filed: Jan. 14, 1994

[51] Int. Cl.⁶ .................................................. C09D 1/00
[52] U.S. Cl. ..................................... 106/214; 106/122
[58] Field of Search ................................ 106/214, 122

[56] References Cited

U.S. PATENT DOCUMENTS

| | | | |
|---|---|---|---|
| 1,769,519 | 7/1930 | King et al. | |
| 1,996,032 | 3/1935 | Roos | 106/36 |
| 1,996,033 | 3/1935 | King | 106/36 |
| 2,772,603 | 12/1956 | Waggoner | 92/39 |
| 2,884,380 | 4/1959 | Cook et al. | 106/214 |
| 3,090,699 | 5/1963 | Bulson | 117/62.2 |
| 3,228,825 | 1/1966 | Waggoner | 162/145 |
| 3,244,632 | 4/1966 | Schulz | 106/214 |
| 3,246,063 | 4/1966 | Podgurski | 264/112 |
| 3,307,651 | 3/1967 | Podgurski | 181/33 |
| 3,367,871 | 2/1968 | Mueller et al. | 106/214 |
| 3,498,404 | 3/1970 | Roberts | 181/33 |
| 3,510,394 | 5/1970 | Cadotte | 162/145 |
| 3,804,706 | 4/1974 | Kurashige | 162/109 |
| 4,062,721 | 12/1977 | Guyer et al. | 162/101 |
| 4,126,512 | 11/1978 | Hill | 162/171 |
| 4,530,653 | 7/1985 | Ishii | 425/363 |
| 4,587,278 | 5/1986 | Dotzauer et al. | 523/200 |
| 4,613,627 | 9/1986 | Sherman et al. | 521/68 |
| 4,801,355 | 1/1989 | Johnstone et al. | 162/181.3 |
| 4,861,822 | 8/1989 | Keskey et al. | 524/559 |
| 4,863,979 | 9/1989 | Beyersdorf et al. | 524/14 |
| 4,925,529 | 5/1990 | Dotzauer et al. | 162/152 |
| 4,941,949 | 7/1990 | Luszczak | 162/310 |
| 4,968,603 | 10/1990 | Felegi | 162/145 |
| 5,013,405 | 5/1991 | Izard | 162/101 |
| 5,022,963 | 9/1991 | Porter et al. | 162/116 |
| 5,047,120 | 9/1991 | Izard et al. | 162/101 |
| 5,106,600 | 4/1992 | Johnstone et al. | 423/164 |
| 5,134,179 | 7/1992 | Felegi | 524/13 |
| 5,250,153 | 10/1993 | Izard et al. | 162/152 |
| 5,277,762 | 1/1994 | Felegi et al. | 162/145 |

FOREIGN PATENT DOCUMENTS

| | | | |
|---|---|---|---|
| 2383899 | 3/1977 | France. | |
| 343838.3 | 10/1984 | Germany. | |
| 1291919 | 10/1972 | United Kingdom | 106/214 |
| 675044 | 7/1977 | U.S.S.R. | |

Primary Examiner—David Brunsman
Attorney, Agent, or Firm—Robert H. Robinson; John M. Lorenzen

[57] ABSTRACT

A mineral wool-free acoustical tile composition and the acoustical tile made therefrom wherein an expanded perlite is used as a substitute for granulated mineral wool to provide porosity and good sound absorption properties. It is preferred that the composition and acoustical tile also contain an inorganic filler to provide texturability during the manufacturing process. In addition, the acoustical tile composition also contains a starch gel binder and a fiber reinforcing agent selected from the group consisting of cellulosic fibers, polymeric fibers and glass fibers. It has been found that the mineral wool-free acoustical tile compositions of this invention have acoustical properties comparable to the commercially available cast mineral wool tiles. In addition, the mineral wool-free compositions can be used to cast an acoustical tile using equipment and procedures currently used to produce cast mineral wool tiles.

18 Claims, No Drawings

MINERAL WOOL-FREE ACOUSTICAL TILE COMPOSITION

FIELD OF THE INVENTION

This invention relates to acoustical tile compositions useful in manufacturing acoustical tiles and panels for ceiling applications. More particularly, this invention relates to acoustical tile compositions which do not contain mineral wool. The invention also relates to a novel combination of expanded perlite, reinforcing fibers and an inorganic filler in an acoustical tile composition.

BACKGROUND OF THE INVENTION

A commercially successful acoustical tile is marketed under the trademark ACOUSTONE and is made generally using the composition and procedures disclosed in U.S. Pat. No. 1,769,519. According to the teachings of this patent, a molding composition comprising granulated mineral wool fibers, fillers, colorants and a binder, in particular a starch gel, is prepared for molding or casting the body of the tile. This mixture or composition is placed upon suitable trays which have been covered with paper or a metallic foil and then the composition is screeded to a desired thickness with a screed bar or roller. A decorative surface, such as elongated fissures, may be provided by the screed bar or roller. The trays filled with the mineral wool pulp or composition are then placed in an oven for twelve (12) hours or more to dry or cure the composition. The dried sheets are removed from the trays and may be treated on one or both faces to provide smooth surfaces, to obtain the desired thickness and to prevent warping. The sheets are then cut into tiles of a desired size.

The mineral wool acoustical tiles of the prior art, as disclosed in U.S. Pat. Nos. 3,246,063 and 3,307,651, generally used a starch gel as a binder for the mineral wool fibers. The gel may comprise a thick boiling starch composition combined with calcined gypsum (calcium sulfate hemihydrate) which are added to water and cooked at 180° F.–195° F. for several minutes to form the starch gel. Thereafter, the granulated mineral wool is mixed into the starch gel to form the aqueous composition which is used to fill the trays.

Mineral wool acoustical tiles are very porous which is necessary to provide good sound absorption. The prior art (U.S. Pat. Nos. 3,498,404; 5,013,405 and 5,047,120) also discloses that mineral fillers, such as expanded perlite, may be incorporated into the composition to improve sound absorbing properties and provide light weight.

It is an object of this invention to provide an acoustical tile composition which contains no mineral wool.

It is another object of this invention to provide a mineral wool-free acoustical tile composition having acoustical properties comparable to the commercially available cast mineral wool tiles.

It is a further object of this invention to provide an acoustical tile composition comprising a combination of expanded perlite, a starch gel binder, reinforcing fibers, and an inorganic filler.

These and other objects will be apparent to persons skilled in the art in view of the description which follows.

SUMMARY OF THE INVENTION

It has been discovered that an expanded perlite can be combined with a standard starch gel binder, an inorganic mineral filler for texturability if desired, and a fiber reinforcing material (non-mineral wool), to provide a dough-like composition (hereinafter referred to as a "pulp") which can be used to cast an acoustical tile using equipment and procedures currently used to produce cast mineral wool tiles. The mineral wool-free pulp can be dried using less energy than employed in drying a mineral wool pulp. The dried product can be formed into tiles having comparable acoustical properties with commercially available acoustical tiles. Acoustical tiles made from the mineral wool-free pulp of this invention have acceptable physical properties for use in suspended ceiling systems.

DETAILED DESCRIPTION OF THE INVENTION

The mineral wool-free acoustical tile compositions of this invention are based on using an expanded perlite as a substitute for granulated mineral wool to provide porosity and good sound absorption properties preferably combined with an inorganic filler to provide texturability. These two ingredients when mixed with a starch gel binder, a fiber reinforcing material and water, provide a mineral wool-free pulp which can be cast or molded in trays using equipment and procedures currently used to produce cast mineral wool tiles.

It has been found that a medium grade expanded perlite provides sufficient porosity and acceptable texturability. The expanded perlite material is commercially available from Silbrico Corporation under the designation Perlite D-1. This medium grade expanded perlite contains perlite particles that are similar in size to granulated mineral wool. A finer grade of perlite (more than 60% by weight passed through a 100 mesh screen) was evaluated, but the pulps made with the finer perlite had a lower texture rating and the dried tiles showed more surface cracking. Other properties such as warpage, hardness and modulus of elasticity were improved by the finer grind. The finer grade perlite particles have greater surface area and require more starch gel binder to obtain texture ratings comparable to the medium grade expanded perlite. In addition, the finer grade perlite increased the criticality of the fiber reinforcement relative to providing an acceptable pulp texture. The range of expanded perlite in the pulp, on a dry solids basis, may be from about 10% by weight to about 85% by weight, with the preferred range being from about 25 to about 50% by weight.

The inorganic mineral filler provides texturability. Tabular acicular gypsum is the preferred filler. Other materials, such as kaolin clay (in natural hydrous form, or a calcined anhydrous form), Gardner ball clay, stucco (calcium sulfate hemihydrate), gypsum (calcium sulfate dihydrate), and fibrous calcium sulfate hemihydrate (FRANKLIN FIBER filler), have been evaluated as fillers. The evaluations indicated that the presence of a filler in the formulation causes a decrease in the final physical properties of the acoustical tile. The filler appeared to contribute to the formation of undesirable surface cracks, particularly in the absence of a fiber reinforcement. The filler also adversely affected acoustical properties. However, the filler has a marked effect upon the texturability of the resultant pulp and is critical in providing a pulp which can be processed on equipment which is currently used to make acoustical tile out of mineral wool pulp. The tabular acicular gypsum filler provided a pulp which had properties most similar to a standard mineral wool pulp. Other fillers which might be used include limestone (calcium carbonate), Feldspar, Nepheline, talc, mica, Wollastonite, synthetic silicates, hydrous alumina, and silica.

The tabular acicular gypsum is made in accordance with the process disclosed in U.S. Pat. Nos. 4,801,355 and 5,106,600. The disclosure in said U.S. Patents is incorporated herein by reference. It is generally preferred that the inorganic mineral filler be present in the pulp, on a dry solids basis, in amounts ranging from about 10% by weight to about 60% by weight, with a range of about 35% to about 50% by weight being particularly preferred.

When the inorganic mineral filler contains water of hydration, e.g. tabular acicular gypsum, the filler may be calcined during the drying of the tile which may be carried out at 350° F. If the gypsum is calcined to a hemihydrate or soluble anhydrite, the tile product may not be stable under high humidity conditions and may sag excessively.

The first step in the preparation of an acoustical tile is the preparation of the starch gel. In general, only the starch is dispersed in water, and the slurry is heated until the starch is fully cooked and the slurry thickens to a viscous gel. In the event a cellulosic fiber is used as a reinforcing agent, it may be incorporated into the starch slurry prior to cooking. The cooking temperature of the starch slurry should be closely monitored to assure full swelling of the starch granules. A representative cooking temperature for corn starch is about 180° F. (82° C.) to about 195° F. (90° C.). The starch gel binder in the pulp may range from about 5% to about 25% on a dry solids basis.

Several types of fiber reinforcing agents have been evaluated in the mineral wool-free acoustical tile compositions of this invention. In general, the fiber reinforcing agents may be selected from cellulosic fibers, polymeric fibers and vitreous (glassy) fibers. Examples of cellulosic fibers are softwood and hardwood fibers and paper fibers. Polyester fibers have been used to prepare a pulp, but the dried product was difficult to cut and to kerf. In addition, E-glass fibers have also been used, but the preferred E-glass fibers require special handling procedures. The fiber reinforcing agent is present in only minor amounts, generally ranging from about 2% to about 10% by weight on a dry solids basis. Other examples of polymeric fibers include rayons, polyolefins, polyamides, nylons, acetates and aramid fibers.

The initial development efforts to produce a starch-based, cast acoustical ceiling product without using mineral wool were directed to developing a product requiring reduced drying energy. The following formulation was developed to provide optimum texturability:

| Ingredient | Amount (grams) | % Solids |
| --- | --- | --- |
| Expanded Perlite (medium grade) | 500 | 42.4 |
| Tabular Acicular Gypsum Filler | 500 | 42.4 |
| Starch Gel Binder | 130 | 11 |
| Cellulosic Fiber | 50 | 4.2 |
| Water | 2,500 | 0 |

The procedure used in preparing the starch-based acoustical tile was very similar to the manufacturing methods used to prepare a standard cast mineral wool tile. The reason for the similarity was the intention to use existing equipment to make the mineral wool-free acoustical tile. It was the basic cast process wherein a starch gel binder was mixed with an expanded perlite and an inorganic filler (preferably tabular acicular gypsum) to produce a dough-like pulp.

The starch gel binder was prepared as set forth above. When cellulosic fibers were used for reinforcement, they were incorporated into the starch gel prior to cooking. Mixing the cooked starch gel with the expanded perlite and the inorganic filler is the final step in preparing the pulp. In the laboratory, the mixing step was carried out in a Hobart (Model A-200) mixer. A mix time of 1 minute at speed No. 1 was determined to be suitable to attain complete mixing of all of the ingredients without breaking down the starch gel and the fragile perlite particles.

Physical testing of laboratory boards was conducted according to established procedures. In most instances, three 10 inch × 3 inch samples were cut from each 12 inch × 12 inch or 12 inch × 24 inch board and tested in a flexural mode using an Instron Model 1130 test instrument. Data normally measured included density (lb./ft.$^3$), the modulus of rupture (MOR) in psi, the modulus of elasticity (in psi) and the hardness (in lbs. using the 2 inch Janka ball hardness method).

EXAMPLE 1

A series of inorganic fillers were evaluated to determine which filler provided the best texturability. The following fillers were tested: Gardner Ball Clay; Kaolin Clay; Stucco (calcium sulfate hemihydrate); Tabular Acicular Gypsum; and Fibrous Calcium Sulfate Hemihydrate (Franklin Fiber Brand). The formulation used to carry out the evaluation was as follows:

| Ingredient | Total Amount (grams) | % Solids |
| --- | --- | --- |
| Expanded Perlite (Slibrico D-1) | 600 | 78.4 |
| Starch Gel | 100 | 15.7 |
| Paper Fiber | 37.5 | 5.9 |
| Filler | Variable 0–300 | — |
| Water | 2,000 | 0 |

TABLE 1

| Filler Type | Filler % | Density (lb./ft.$^3$) | MOR(psi) |
| --- | --- | --- | --- |
| Ball Clay | 13.6 | 14.1 | 174 |
| Ball Clay | 23.9 | 14.3 | 148 |
| Ball Clay | 32.0 | 16.1 | 215 |
| Kaolin Clay | 13.6 | 13.7 | 151 |
| Kaolin Clay | 23.9 | 14.8 | 166 |
| Kaolin Clay | 38.6 | 19.1 | 170 |
| Stucco | 13.6 | 13.7 | 117 |
| Stucco | 23.9 | 16.0 | 110 |
| Stucco | 32.0 | 17.1 | 115 |
| Acicular Gypsum | 13.6 | 14.1 | 150 |
| Acicular Gypsum | 23.9 | 15.2 | 146 |
| Acicular Gypsum | 32.0 | 16.6 | 133 |
| Franklin Fiber | 5.2 | 12.7 | 130 |
| Franklin Fiber | 9.9 | 13.7 | 115 |

The tabular acicular gypsum provided pulp properties most similar to those of granulated mineral wool and the best texturability.

EXAMPLE 2

A variety of cellulosic fiber types were evaluated in a mineral wool-free pulp. The following cellulosic fibers were used in the pulp formulations which did not contain an inorganic filler:
1) a medium wood fiber type
2) a coarse wood fiber type
3) pulped fly leaf—a highly refined bleached fiber obtained by hydropulping waste office paper
4) bleached softwood kraft—a long fibered, bleached, softwood kraft fiber The following formulation was used:

| Ingredient | Total Amount (grams) | % Solids |
|---|---|---|
| Expanded Perlite (D-1) | 500 | 83.3 |
| Starch Gel | 100 | 16.7 |
| Cellulosic Fiber | Variable 0–66.67 | — |
| Filler | 0 | — |
| Water | 2,000 | 0 |

The acoustical tiles made from this pulp formulation using the various cellulosic fibers were evaluated and yielded the following results:

| Fiber Type | % Fiber | Density (lb./ft.$^3$) | MOR (psi) | MOE (psi) |
|---|---|---|---|---|
| Medium Wood Fiber | 2.0 | 11.4 | 82.5 | 14,400 |
| Medium Wood Fiber | 4.0 | 11.8 | 107 | 13,800 |
| Medium Wood Fiber | 6.0 | 12.1 | 120 | 15,900 |
| Medium Wood Fiber | 7.6 | 12.2 | 133 | 16,800 |
| Medium Wood Fiber | 10 | 12.4 | 152 | 17,500 |
| Coarse Wood Fiber | 2.0 | 11.7 | 79.8 | 12,000 |
| Coarse Wood Fiber | 4.0 | 11.6 | 88.0 | 11,800 |
| Coarse Wood Fiber | 6.0 | 11.7 | 105 | 13,200 |
| Coarse Wood Fiber | 8.0 | 11.8 | 112 | 14,000 |
| Coarse Wood Fiber | 10 | 11.9 | 118 | 15,700 |
| Pulped Fly Leaf | 2.0 | 11.4 | 97.8 | 14,000 |
| Pulped Fly Leaf | 3.9 | 12.0 | 122 | 15,200 |
| Pulped Fly Leaf | 6.1 | 12.0 | 143 | 16,000 |
| Pulped Fly Leaf | 8.2 | 12.1 | 165 | 18,500 |
| Softwood Kraft | 2.0 | 11.2 | 103 | 13,700 |
| Softwood Kraft | 4.0 | 12.0 | 143 | 15,400 |

The cellulosic fiber substantially improved the flexural strength of the acoustical tiles, particularly the pulped fly leaf and the softwood kraft. Incorporation of the cellulosic fibers in the formulation provides a stronger and stiffer product. The cellulosic fiber also reduces or eliminates surface cracking and promotes a more open and porous board which improves acoustical properties.

EXAMPLE 3

A comparative study was performed to determine the drying time for the mineral wool-free acoustical tile compared to a standard, cast mineral wool tile. The mineral wool-free pulp had the following formulation:

| Ingredient | Total Amount (grams) | % Solids |
|---|---|---|
| Expanded Perlite (D-1 Med. grade) | 500 | 42.4 |
| Tabular Acicular Gypsum | 500 | 42.4 |
| Starch Gel | 130 | 11.0 |
| Cellulosic Fiber | 50 | 4.2 |
| Water | 2,500 | 0 |

One 12 inch×12 inch sample of each material was dried in an oven at 300° F., and its weight was monitored every half-hour until dry. The mineral wool-free pulp dried in 4.7 hours compared to 5.3 hours for the standard granulated mineral wool pulp. This represents a 10.6% reduction in the drying time.

EXAMPLE 4

In a plant trial, a mineral wool-free pulp was prepared based on a starch gel binder and containing expanded perlite, tabular acicular gypsum and a cellulosic fiber (wood fiber) reinforcing agent. The starch gel consisted of starch, wood fiber refined in a Bauer refiner, and water. The refined wood fiber was dispersed in 150 gallons (1252 lb.) of cold water in a slurry which formed a thick suspension. The starch fiber slurry was fed into the cook tank containing 373 gallons of hot water and the gel was cooked at 194° F. The starch gel had the following formulation:

| Ingredient | Solids Amount (lbs.) | % Solids |
|---|---|---|
| Starch | 207 | 73.7 |
| Wood Fiber | 74 | 26.3 |
| Water | 3,103 | 0 |

A first mineral wool-free pulp batch was prepared by feeding the starch gel into a ribbon mixer and mixing it with a medium grade expanded perlite (D-1) and tabular acicular gypsum, which were hand fed into the top of the mixer. The ingredients were mixed for one minute whereupon it was observed that the pulp was too fluid. Additional perlite and acicular gypsum were added to the mixer incrementally and in equal portions in order to produce a pulp having a consistency similar to a standard granulated mineral wool pulp. The first pulp batch was cast into tiles using a standard aluminum foil backing. A second pulp batch was prepared in a similar manner but was cast onto a white paper backing. The final formulation for these batches was as follows:

| Ingredient | Solids Amount (lbs.) | % Solids |
|---|---|---|
| Expanded Perlite | 327 | 44.6 |
| Tabular Acicular Gypsum | 327 | 44.6 |
| Starch | 59 | 8.0 |
| Wood Fiber | 21 | 2.8 |
| Water | 886 | 0 |

The starch, wood fiber and water amounts were based on the addition of 966 pounds of starch gel to the mixer.

A third pulp batch was also made using the same amount of starch gel as in the first and second batches, but using additional expanded perlite and tabular acicular gypsum. This third batch was also cast onto the white paper backing. All three pulp batches were dried in a kiln, and the dried acoustical tiles were fabricated into 23.75 inch×23.75 inch panels and tested for physical properties. All of the panels had surface cracking, and creases in the backing were also observed. The physical properties were compared to standard granulated mineral wool panels as follows:

TABLE 4

| Physical Property | Mineral Wool-Free Panels | Mineral Wool Panels |
|---|---|---|
| Density (lb./ft.$^3$) | 21.0 | 23.2 |
| MOR (psi) | 75.6 | 156 |
| MOE (psi) | 11,400 | 16,800 |
| Hardness (lbs.) | 199 | 179 |
| NRC (impedance tube) | 0.42 | 0.64 |

It was concluded that a mineral wool-free pulp consisting of expanded perlite, tabular acicular gypsum, fiber reinforcing agent, starch gel binder and water can be cast into acoustical tiles using the equipment currently used to manufacture acoustical tiles based on granulated mineral wool. As a result of the incorporation of additional amounts of expanded perlite and acicular gypsum, the proportion of starch binder and fiber reinforcing agent was reduced and the physical and acoustical properties were adversely affected.

EXAMPLE 5

A pulp was prepared substituting kaolin clay for the tabular acicular gypsum as the inorganic mineral filler. The following formulation was used:

| Ingredient | Dry Amount (grams) | % Solids |
| --- | --- | --- |
| Expanded Perlite (D-1) | 600 | 41.7 |
| Kaolin Clay | 600 | 41.7 |
| Starch | 168 | 11.7 |
| Cellulosic Fiber (bleached softwood kraft) | 70 | 4.9 |
| Water | 3,800 | 0 |

Physical testing was performed according to established laboratory procedures. Four 10 inch×3 inch samples were cut from the dried board and tested in a flexural mode using an Instron Model 1130 instrument. The results were compared to a laboratory-made, granulated mineral wool tile as follows:

| Physical Property | Mineral Wool Tile | Mineral Wool-Free Tile |
| --- | --- | --- |
| Density (lb./ft.$^3$) | 22.1 | 17.3 |
| MOR (psi) | 222 | 239 |
| Hardness (lbs.) | 256 | 185 |
| NRC (impedance tube method) | 0.55 | 0.60 |

In small scale fire resistance testing, the mineral wool-free tile containing the kaolin clay provided substantially better fire resistance properties compared to the mineral wool tile.

It had previously been observed that when the mineral wool-free pulp was cast on an aluminum foil backing, the tile tended to "puff" during drying, i.e. the build-up of pressure within the board caused a splitting along the midline of the panel. It was found that this problem could be overcome by incorporating a surfactant into the pulp composition which increases the rate of drying. Examples of surfactants which are effective in these compositions are the following: Polyoxyethylene (20) sorbitan monolaurate; Polyoxyethylene (14)monolaurate; Polyoxyethylene (23) monolaurate; Polyoxyethylene (45)monolaurate; Polyoxyethylene glycol (20) monolaurate; Glycerol monooleate; Sorbitan monolaurate; Olefin sulfonate; Aliphatic sulfonate; Aliphatic sulfate; Aliphatic carboxylate.

EXAMPLE 6

This example demonstrates the effectiveness of incorporating a surfactant into the pulp. The following formulation was used both with and without surfactant:

| Ingredient | Amount (grams) | Amount (grams) |
| --- | --- | --- |
| Expanded Perlite | 250 | 250 |
| Tabular Acicular Gypsum | 50 | 50 |
| Cellulosic Fiber | 25 | 25 |
| Starch Gel | 70 | 70 |
| Water | 1,350 | 1,350 |
| Surfactant (polyoxyethylene (20) glycol monolaurate) | 3 | 0 |

The pulp formulations with and without surfactant were cast into trays having an aluminum foil backing and then dried in an oven at 350° F. (177° C.). The tile without surfactant showed severe puffing and required 7.9 hours to dry. The tile with surfactant showed no puffing and dried in 5.6 hours.

EXAMPLE 7

Mineral wool-free acoustical tiles were prepared from compositions which did not contain an inorganic filler. The starch gel was prepared by dispersing the starch in 125 gallons of cold water and then adding this solution to 430 gallons of hot water (210° F.) in a cook tank. The starch was cooked to 194° F., afterwhich, the surfactant (Magrabar VS 100) was added to the starch gel which had the following formulation:

| Ingredient | Total Amount (lbs) |
| --- | --- |
| Starch | 257 |
| Surfactant (Magrabar VS 100) | 6 |
| Cold Water | 1,043 |
| Hot Water | 3,589 |

A first pulp batch was prepared by transferring the starch gel into a ribbon mixer and mixing it with cellulosic fiber for about 15 minutes. Then a medium grade expanded perlite was added to the mixer and mixed for one minute. Thereafter, the pulp was cast onto trays using a standard aluminum foil backing and was textured using a screed bar to produce a fissured texture. Two additional pulp batches were similarly produced but a screed bar providing a smooth texture was used. All of the tiles were dried in a kiln at 350° F. for 2 hours.

The pulp for the first and second batches had the following formulation:

| Ingredient | Total Amount (lbs.) | % Solids |
| --- | --- | --- |
| Expanded Perlite (D-1) | 300 | 71.4 |
| Cellulosic Fiber (paper) | 29 | 6.9 |
| Starch* | 89 | 21.2 |
| Surfactant* | 2 | 0.5 |
| Water* | 1,602 | — |

*based on the addition of 1693 lbs. of starch gel to the mixer.

The third pulp batch had the following formulation:

| Ingredient | Total Amount (lbs.) | % Solids |
| --- | --- | --- |
| Expanded Perlite (D-1) | 240 | 71.4 |
| Cellulosic Fiber (paper) | 23 | 6.9 |
| Starch* | 71 | 21.1 |
| Surfactant* | 2 | 0.6 |
| Water* | 1,277 | — |

*based on the addition of 1350 lbs. of starch gel to the mixer.

The dried product from all batches had very slight surface cracking over the entire surface of the tiles. The tiles exhibited a significant amount of negative warpage but had very good acoustical properties.

EXAMPLE 8

Two pulps were prepared using a polyester fiber (¼ inch length) reinforcing agent. Some of the expanded perlite was replaced with a tabular acicular gypsum filler. Either polystyrene beads or polyvinyl alcohol foam were used to improve acoustical performance. These acoustical enhancers may be present in amounts up to about 5% by weight. One starch gel contained a surfactant (Magrabar VS 100) which was added to the cook tank after the starch was cooked.

The starch gel was delivered into the ribbon mixer and then the polyester fibers were added. It required about 2 minutes to disperse the fibers in the gel. The balance of the solids (acicular gypsum, expanded perlite and polystyrene beads) were hand fed to the mixer and were mixed for about one minute. The second pulp batch was made in a similar manner, though no surfactant was added to the starch gel and a polyvinyl alcohol foam was used instead of polystyrene beads. The PVA foam was added last, and after it was added, the pulp was mixed for only 5 seconds in order to maintain the foam bubbles.

The following formulation was used for the first pulp:

| Ingredient | Total Amount (lbs.) | % Solids |
|---|---|---|
| Expanded Perlite (D-1) | 210 | 39.0 |
| Tabular Acicular Gypsum | 200 | 37.2 |
| Starch | 97.2 | 18.1 |
| Surfactant (Magrabar VS 100) | 1.2 | 0.2 |
| Polyester Fiber (Trevira 101) | 23 | 4.3 |
| Polystyrene Beads | 6.6 | 1.2 |
| Water (in starch gel) | 1,352 | — |

The second batch formulation was as follows:

| Ingredient | Total Amount (lbs.) | % Solids |
|---|---|---|
| Expanded Perlite (D-1) | 210 | 41.9 |
| Tabular Acicular Gypsum | 200 | 39.9 |
| Starch | 70.4 | 14.0 |
| Polyester Fiber (Trevira 101) | 20.5 | 4.1 |
| Polyvinyl Alcohol Foam | 0.4 | 0.1 |
| Water (in foam) | 3.75 | |
| Water (in starch gel) | 980 | |

The surface of the dried tiles were free of surface cracks, and none of the tiles had channeling on the back even though they were cast on standard aluminum foil backing. The results of the evaluations, compared to mineral wool acoustical tiles, are set forth in the following table:

TABLE 8

| Property | Pulp #1 | Pulp #2 | Mineral Wool Tile |
|---|---|---|---|
| Thickness (inches) | 0.786 | 0.807 | 0.709 |
| Density (lb./ft.³) | 14.3 | 15.9 | 24.2 |
| MOR (psi) | 151 | 189 | 239 |
| Ball Hardness (lbs) | 133 | 193 | 234 |
| NRC (Impedance Tube) | 0.59 | 0.57 | 0.58 |

Both pulps exhibited promising acoustical and physical properties.

EXAMPLE 9

A series of mineral wool-free acoustical tiles was prepared using glass fiber reinforcing agents. Glass fiber diameter and length were evaluated. The glass fibers were provided by Owens Corning Fiberglas and were identified as follows:

| | Ex.9-1 | Ex.9-2 | Ex.9-3 | Ex.9-4 |
|---|---|---|---|---|
| Diameter (microns) | 9.0 | 9.0 | 7.5 | 7.5 |
| Sizing | 691 | 691 | 691 | 691 |
| Moisture Content | 20% | 20% | 20% | 20% |
| Chop Length (inches) | ⅛ | ¼ | ⅛ | ¼ |

Each of the four glass fibers were slurried in the same way. Water (82.5 lbs.) was placed into a 5 gallon container and heated to 120° F. with steam. Then the glass fibers (25.5 lbs.) were slowly added to the warm water. The glass fibers were allowed to soak in the warm water for several minutes and then the slurry was gently mixed. The glass fiber slurry was then mixed into the starch gel in the ribbon mixer for one minute, after-which the other solids were added and mixed together to make a pulp. The glass fiber slurry contained a surfactant (sizing agent) and no additional surfactant was added.

The first pulp batch (ex. 9-1) had the following formulation:

| Ingredient | Wet Amount (lbs.) | Dry Amount (lbs.) | % Solids |
|---|---|---|---|
| Starch Gel (6.4% starch) | 1,250 | 80 | 15.9 |
| Glass Fiber Slurry | 108 | 21.3 | 4.2 |
| Expanded Perlite (D-1) | — | 195 | 38.8 |
| Tabular Acicular Gypsum | — | 200 | 39.8 |
| Polystyrene Beads | — | 6.6 | 1.3 |

The other pulps (Ex. 9-2, Ex. 9-3 and Ex. 9-4) contained the same ingredients in the same amounts except for the starch gel. Ex.9-2 contained 1200 lbs. (wet amount) of the 6.4% starch gel, and Ex. 9-3 and Ex. 9-4 contained 1225 lbs. (wet amount) of the 6.4% starch gel. Each pulp was cast in trays having a standard aluminum foil backing. The pulps were textured with a screed bar to provide the tile with a smooth surface. They were dried in a kiln for 12 hours at 300° F.

The four pulp batches were tested as acoustical tiles and compared to a commercially available mineral wool acoustical tile. Trial samples were cut in both the machine and cross machine direction, designated MD and CMD respectively. Three 10 inch×3 inch test pieces were cut from each of 6 different panels. The results for the test samples cut in the machine direction and broken across the machine direction were as follows:

| Property | Ex. 9-1 | Ex. 9-2 | Ex. 9-3 | Ex. 9-4 | Mineral Wool Tile |
|---|---|---|---|---|---|
| Thickness (inches) | 0.888 | 0.848 | 0.827 | 0.788 | 0.862 |
| Density (lb./ft.³) | 12.7 | 13.2 | 13.4 | 12.2 | 22.4 |
| M.O.R. (psi) | 95 | 113 | 123 | 124 | 168 |
| M.O.E. (psi) | 17,000 | 23,500 | 27,800 | 26,000 | 29,200 |
| Ball Hardness (lbs.) | 85 | 88 | 87 | 81 | — |
| NRC (impedance tube) | 0.61 | 0.61 | 0.67 | 0.64 | 0.68 |

The results for the test samples cut across the machine direction and broken along the machine direction were as follows:

| | | | | |
|---|---|---|---|---|
| Thickness (in.) | 0.873 | 0.814 | 0.850 | 0.780 |
| Density (lb./ft.³) | 12.8 | 13.4 | 13.5 | 12.3 |
| M.O.R. (psi) | 73 | 70 | 76 | 86 |
| M.O.E. (psi) | 14,800 | 17,400 | 20,700 | 18,500 |

-continued

| Property | Ex. 9-1 | Ex. 9-2 | Ex. 9-3 | Ex. 9-4 | Mineral Wool Tile |
|---|---|---|---|---|---|
| Ball Hardness (lbs.) | 82 | 90 | 89 | 79 | |

All of the formulations textured well on the production line. There were no problems in dispersing the glass fibers. The tiles exhibited good physical and acoustical properties.

Having completely described this invention, what is claimed is:

We claim:

1. A wetted, mineral wool-free pulp composition suitable for making acoustical tiles comprising at least about 10% by weight on a dry solids basis of expanded perlite, at least about 5% by weight on a dry solids basis of a starch gel binder, at least about 35% by weight on a dry solids basis of an inorganic mineral filler selected from the group consisting of calcium sulfate dihydrate, calcium sulfate hemihydrate, silicates, limestone and alumina, and from about 2% to about 10% by weight of a fiber reinforcing agent selected from the group consisting of polymeric fibers and glass fibers.

2. The composition of claim 1 which also contains a surfactant to increase the rate of drying.

3. The composition of claim 1 in which the inorganic mineral filler is selected from the group consisting of kaolin clay, ball clay, stucco, gypsum and fibrous calcium sulfate hemihydrate.

4. The composition of claim 3 which contains up to about 5% by weight of an acoustical enhancer selected from polystyrene beads and polyvinyl alcohol foam.

5. The composition of claim 3 in which both the expanded perlite and the inorganic mineral filler range from about 35% to about 50% by weight of the composition on a dry solids basis.

6. The composition of claim 5 in which the inorganic mineral filler is tabular acicular gypsum.

7. The composition of claim 6 in which the fiber reinforcing agent is selected from the group consisting of wood and paper fibers.

8. The composition of claim 6 in which the fiber reinforcing agent is glass fibers.

9. The composition of claim 8 which contains up to about 5% by weight of an acoustical enhancer selected from polystyrene beads and polyvinyl alcohol foam.

10. A dry mineral wool-free acoustical tile comprising at least about 10% by weight of expanded perlite, at least about 5% by weight of a starch binder, at least about 35% by weight of an inorganic mineral filler selected from the group consisting of calcium Sulfate dihydrate, Calcium Sulfate hemihydrate, silicates, limestone and alumina, and from about 2% to about 10% by weight of a fiber reinforcing agent selected from the group consisting of polymeric fibers and glass fibers.

11. The acoustical tile of claim 10 in which the inorganic mineral filler is selected from the group consisting of kaolin clay, ball clay, stucco, gypsum and fibrous calcium sulfate hemihydrate.

12. The acoustical tile of claim 11 which contains up to about 5% by weight of an acoustical enhancer selected from polystyrene beads and polyvinyl alcohol foam.

13. The acoustical tile of claim 11 in which both the expanded perlite and the inorganic mineral filler range from about 35% to about 50% by weight of the composition.

14. The acoustical tile of claim 13 in which the inorganic mineral filler is tabular acicular gypsum.

15. The acoustical tile of claim 14 in which the fiber reinforcing agent is selected from the group consisting of wood and paper fibers.

16. The acoustical tile of claim 14 in which the fiber reinforcing agent is glass fibers.

17. The acoustical tile of claim 16 which contains up to about 5% by weight of an acoustical enhancer selected from polystyrene beads and polyvinyl alcohol foam.

18. A dry mineral wool-free acoustical tile comprising about 40% by weight of expanded perlite, about 40% by weight of tabular acicular gypsum, about 15% by weight of a starch binder and about 5% by weight of a glass fiber reinforcing agent.

* * * * *